United States Patent
Hsu et al.

(10) Patent No.: US 10,613,648 B2
(45) Date of Patent: Apr. 7, 2020

(54) PRESSURE SENSING POINTER

(71) Applicant: SHENZHEN PU YING INNOVATION TECHNOLOGY CORP., LTD., Shenzhen (CN)

(72) Inventors: Chung-Wen Hsu, Shenzhen (CN); Chung-Hsuan Li, Shenzhen (CN)

(73) Assignee: SHENZHEN PU YING INNOVATION TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 16/359,415

(22) Filed: Mar. 20, 2019

(65) Prior Publication Data

US 2020/0050293 A1 Feb. 13, 2020

(30) Foreign Application Priority Data

Aug. 7, 2018 (CN) .......................... 2018 1 0890625

(51) Int. Cl.
*G06F 3/0354* (2013.01)
*G01L 1/00* (2006.01)
*G01L 5/00* (2006.01)

(52) U.S. Cl.
CPC ............ *G06F 3/03545* (2013.01); *G01L 1/00* (2013.01); *G01L 5/0038* (2013.01)

(58) Field of Classification Search
None
See application file for complete search history.

(56) References Cited

U.S. PATENT DOCUMENTS

| 5,565,632 A * | 10/1996 | Ogawa | G06F 3/03545 73/862.041 |
| 8,648,839 B2 * | 2/2014 | Liaw | G06F 3/03545 178/18.01 |
| 2013/0241897 A1 * | 9/2013 | Fukushima | G06F 3/03545 345/179 |
| 2019/0265811 A1 * | 8/2019 | Lien | G06F 3/03545 |

* cited by examiner

*Primary Examiner* — Duane N Taylor, Jr.
(74) *Attorney, Agent, or Firm* — Rabin & Berdo, P.C.

(57) ABSTRACT

A pressure sensing pointer includes a housing, an electromagnetic unit, a cartridge, a pressing member, a first elastic member, a second elastic member, and a pressure sensing element. The housing has an accommodating space and a port in communication with the accommodating space. The electromagnetic unit is located inside the accommodating space. The cartridge is movably disposed at the port along an axial direction. The pressing member is movably disposed in the accommodating space, and is in linkage connection to the cartridge. One end of the first elastic member is fixed on the pressing member. One end of the second elastic member abuts against the pressing member An amount of compression deformation of the second elastic member in the axial direction is greater than an amount of compression deformation of the first elastic member in the axial direction. The pressure sensing element faces toward the first elastic member.

12 Claims, 6 Drawing Sheets

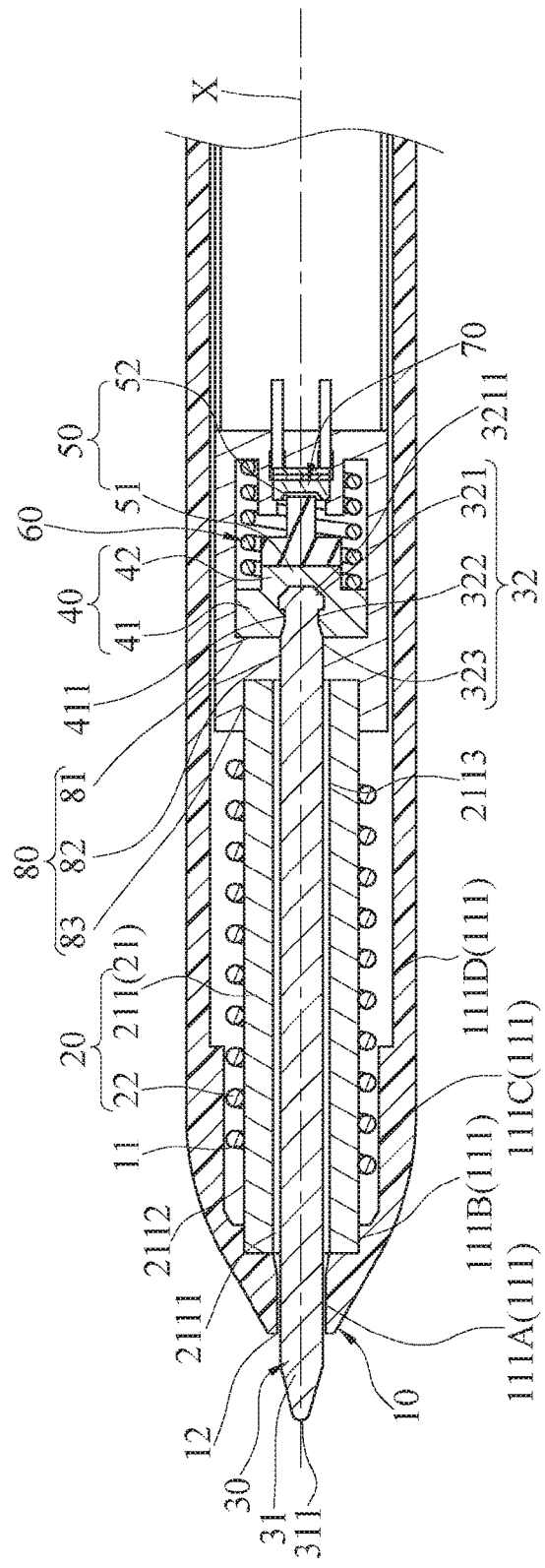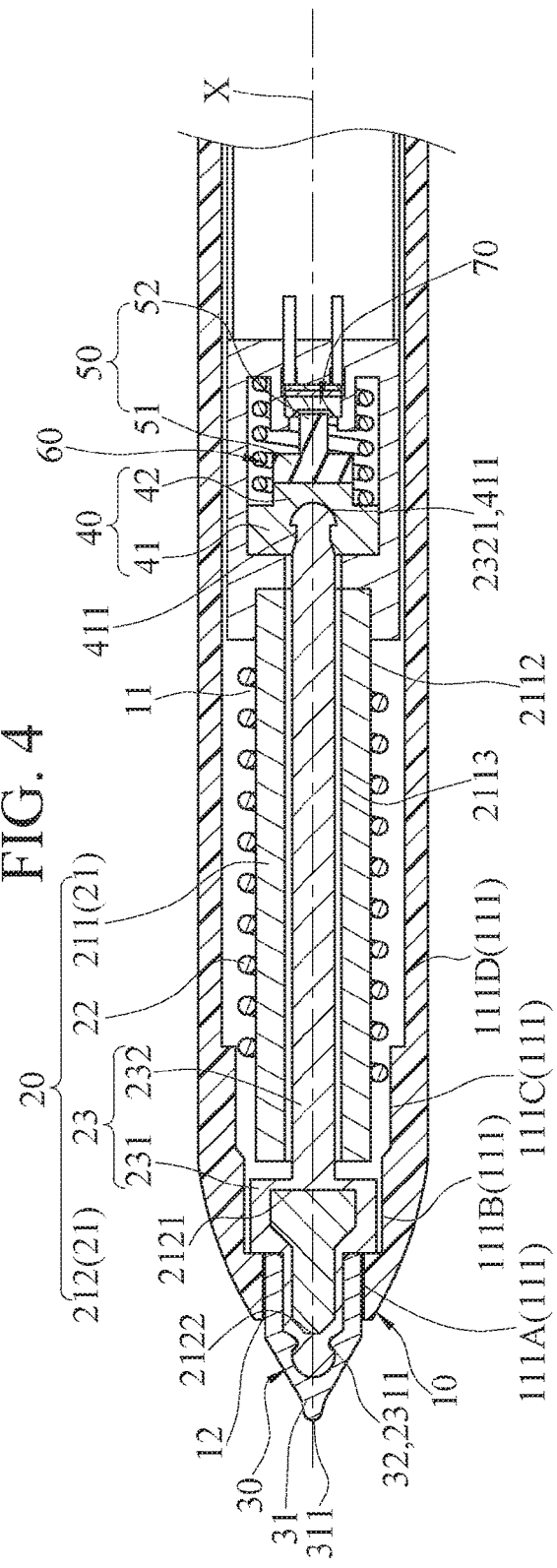
FIG. 4
FIG. 5

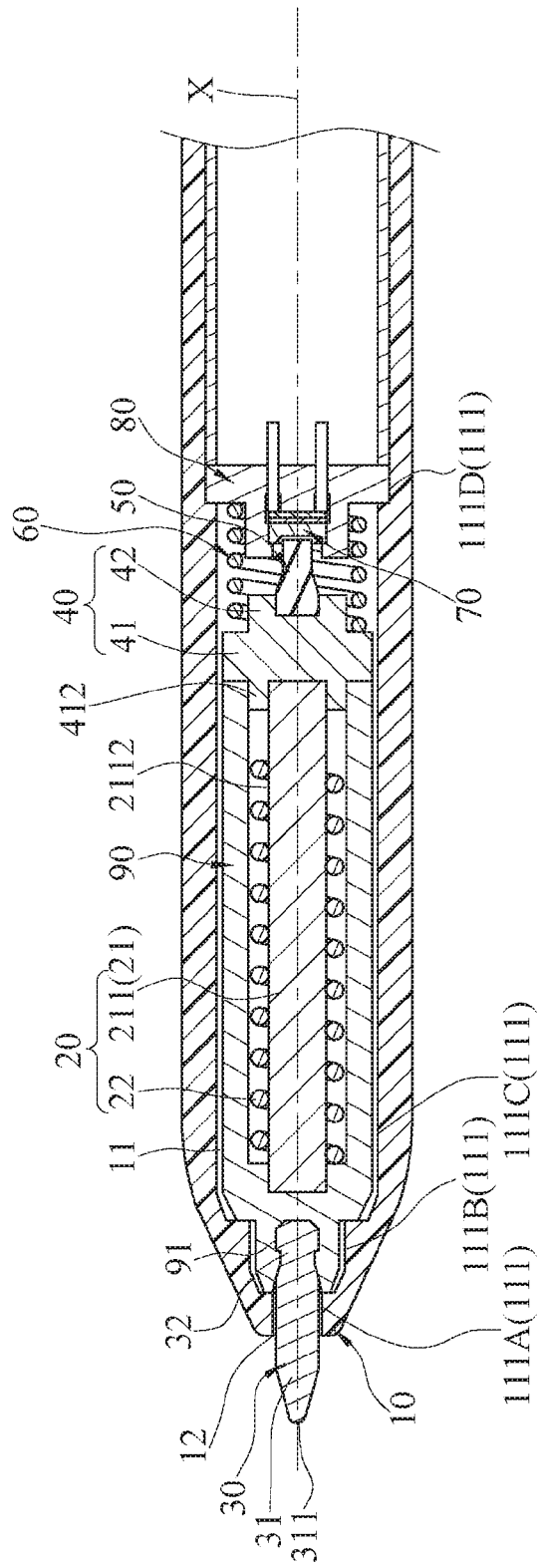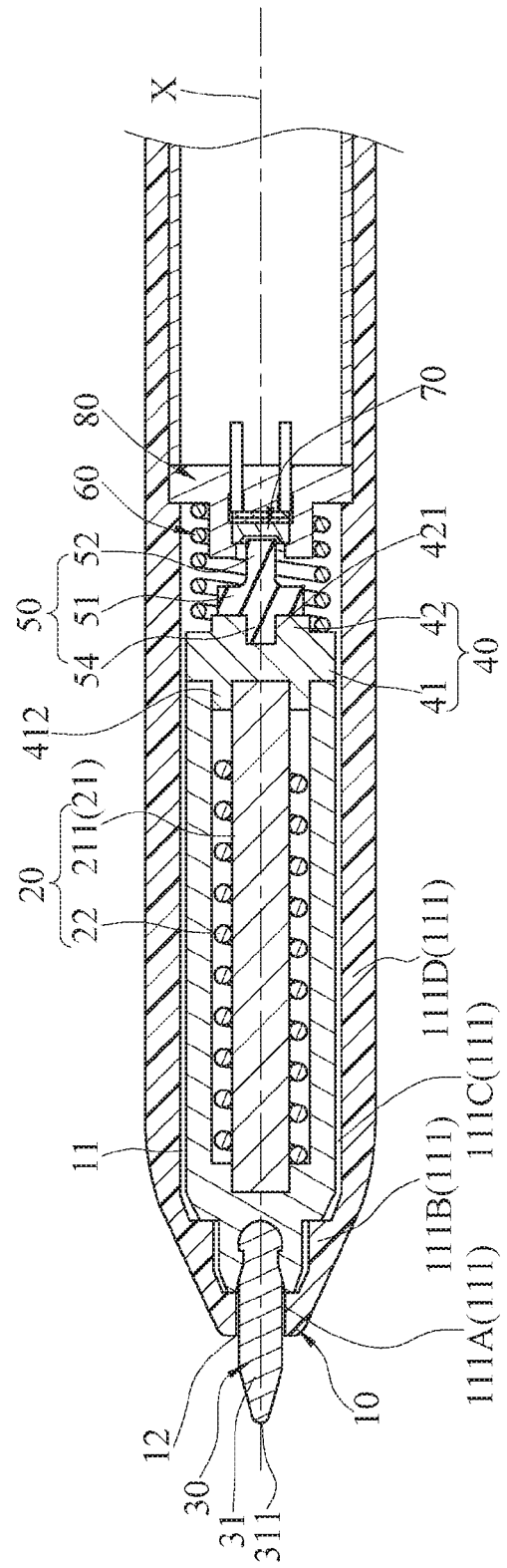

PRESSURE SENSING POINTER

CROSS-REFERENCE TO RELATED APPLICATION

This non-provisional application claims priority under 35 U.S.C. § 119(a) to Patent Application No. 201810890625.8 filed in China, P.R.C. on Aug. 7, 2018, the entire contents of which are hereby incorporated by reference.

BACKGROUND

Technical Field

Embodiments of the present invention relate to an indicator, and in particular, to a pressure sensing pointer.

Related Art

With the development of science and technology, more electronic devices use touch panels as control interfaces, for example, smartphones, tablet computers, or personal digital assistants (PDA). This enables users to perform operations in a touch manner, thereby improving convenience. In addition, to achieve a faster and more accurate operation process of a touch panel, a pen-type pointer is recommended for input (for example, writing or tapping).

A type of a pointer is determined based on a touch manner of a touch panel. At present, relatively widely applied touch manners of touch panels are resistive touch manner, capacitive touch manner, electromagnetic touch manner, and the like. An electromagnetic touch technology is mainly that handwriting is formed by electromagnetic signals that are detected by using a digitizer tablet and that are from a pointer. For a pressure sensing pointer, an elastic member is usually pressed by using a cartridge, then a pressure sensor is pressed, to sense stroke pressure for writing. The elastic member mainly presents a pressure gradient when a user performs writing and provides an elastic force returning the cartridge to an initial position.

It can be learned that after the pressure sensing pointer is used for a period of time, the elastic member may fail to provide an elastic force due to elastic fatigue or deformation of the elastic member. Consequently, the cartridge cannot be pushed back to the initial position, resulting in inaccurate sensing.

SUMMARY

To achieve the foregoing purposes, the present invention provides a pressure sensing pointer, including a housing, an electromagnetic unit, a cartridge, a pressing member, a first elastic member, a second elastic member, and a pressure sensing element. The housing has an accommodating space and a port, and the port is in communication with the accommodating space. The electromagnetic unit is located inside the accommodating space and includes a magnet and a coil, and the coil is wound outside the magnet. The cartridge is movably disposed at the port of the housing along an axial direction. The pressing member is movably disposed in the accommodating space along the axial direction, and is connected to the cartridge. The first elastic member is disposed inside the housing, and one end is fixed on the pressing member. The second elastic member is disposed inside the housing, one end abuts against the pressing member, the other end is fixedly disposed inside the accommodating space, and an amount of compression deformation of the second elastic member in the axial direction is greater than an amount of compression deformation of the first elastic member in the axial direction. The pressure sensing element is fixedly disposed inside the accommodating space, and the pressure sensing element faces toward the other end of the first elastic member.

BRIEF DESCRIPTION OF THE DRAWINGS

FIG. 4 is a schematic sectional structural diagram of another embodiment of a pressure sensing pointer according to the present invention;

FIG. 5 is a schematic sectional structural diagram of still another embodiment of a pressure sensing pointer according to the present invention;

FIG. 6 is a schematic sectional structural diagram of yet another embodiment of a pressure sensing pointer according to the present invention;

FIG. 7 is a schematic sectional structural diagram of still yet another embodiment of a pressure sensing pointer according to the present invention;

DETAILED DESCRIPTION

Figure 1:
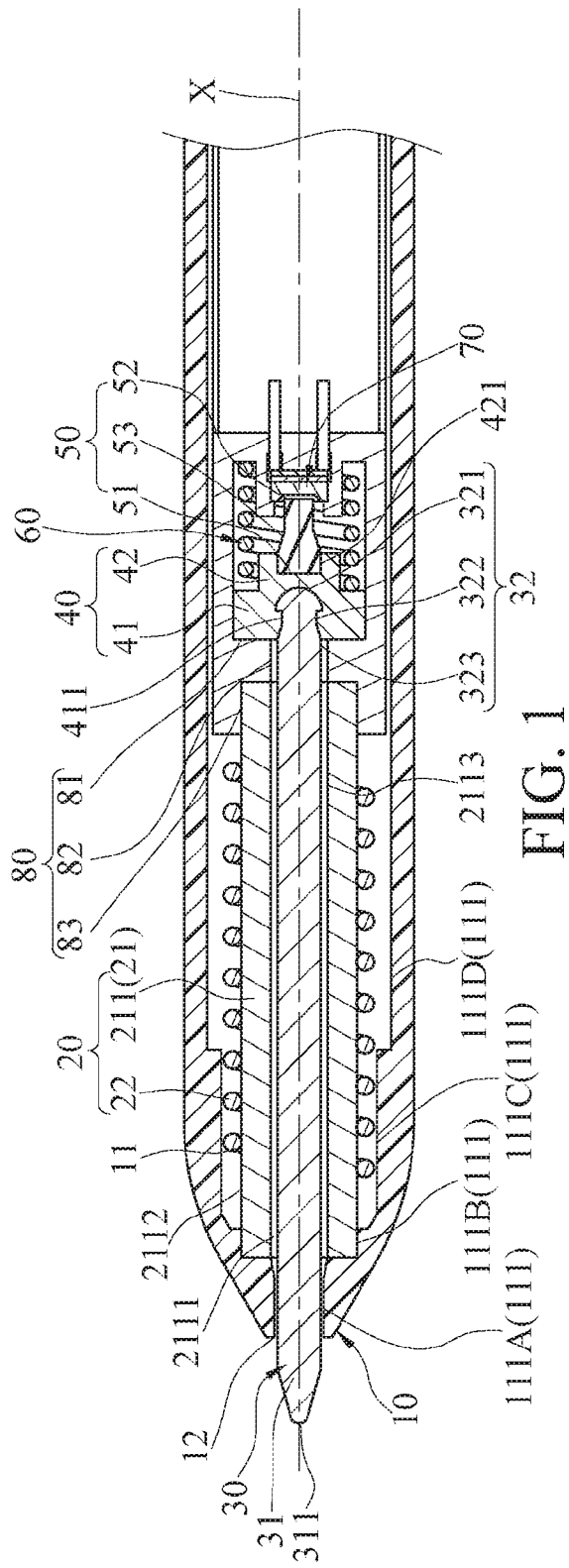
FIG. 1 is a schematic sectional structural diagram of an embodiment of a pressure sensing pointer according to the present invention.

Referring to FIG. 1, FIG. 1 is a schematic sectional structural diagram of an embodiment of a pressure sensing pointer according to the present invention. The pressure sensing pointer herein is a passive or proactive electromagnetic induction indicator that has a circuit unit and that is used in combination with a digitizer tablet.

The pressure sensing pointer shown in FIG. 1 includes a housing 10, an electromagnetic unit 20, a cartridge 30, a pressing member 40, a first elastic member 50, a second elastic member 60, and a pressure sensing element 70.

Referring to FIG. 1, the housing 10 has an accommodating space 11 and a port 12 in communication with the accommodating space 11. The electromagnetic unit 20 is located inside the accommodating space 11, and includes a magnet 21 and a coil 22 winding around the magnet 21. The cartridge 30 is movably disposed at the port 12 of the housing 10 along an axial direction X. The pressing member 40 is disposed inside the accommodating space 11, and is in linkage connection to the cartridge 30. The first elastic member 50 and the second elastic member 60 are disposed inside the accommodating space 11, and one ends of the first elastic member 50 and the second elastic member 60 abut against the pressing member 40. The other end of the second elastic member 60 is fixedly disposed inside the accommodating space 11, and an amount of compression deformation of the second elastic member 60 in the axial direction X is greater than an amount of compression deformation of the first elastic member 50. The pressure sensing element 70 is disposed inside the accommodating space 11 and faces toward the other end of the first elastic member 50.

In this way, during use, the digitizer tablet emits electromagnetic energy. The pressure sensing pointer receives the electromagnetic energy emitted by the digitizer tablet. The coil 22 induces and couples the electromagnetic energy. Based on such an electromagnetic exchange process, a position of the pressure sensing pointer can be calculated, to accurately display handwriting. When the pressure sensing pointer acts on the digitizer tablet and applies pressure to the cartridge 30, the cartridge 30 drives the pressing member 40 and applies pressure to the pressure sensing element 70 by using the first elastic member 50. The pressure sensing element 70 senses the pressure of the cartridge 30, and can further calculate handwriting pressure, to more accurately display the handwriting with a pressure change.

In this way, the digitizer tablet receives an electromagnetic signal emitted from the pressure sensing pointer, and calculates the position and stroke pressure of the pressure sensing pointer by using a proper calculation method based on a value and frequency of the electromagnetic signal emitted from the pressure sensing pointer and a pressure value measured by the pressure sensing element 70, thereby generating the handwriting. In addition, the first elastic member 50 may provide pressure to obtain proper writing feeling. The second elastic member 60 can ensure that a position of the cartridge 30 can be returned to an initial position, and an induced electromagnetic signal is simultaneously returned to zero, thereby facilitating next writing sensing.

In an embodiment, continuing to refer to FIG. 1, the housing 10 is a hollow long-strip-shaped pen-type enclosure extending along the axial direction X, but is not limited thereto. Herein, one end of the housing 10 is open, and the other end is closed. The housing 10 is not limited thereto. Further, the accommodating space 11 of the housing 10 is divided into a plurality of segments 111, to correspondingly accommodate the electromagnetic unit 20, the cartridge 30, and other internal components.

More specifically, further referring to FIG. 1, the accommodating space 11 of the housing 10 in this embodiment is sequentially divided into a first segment 111A, a second segment 111B, and a third segment 111C from the port 12 to the other end. Herein, an inner diameter of the first segment 111A is less than an inner diameter of the second segment 111B, and the inner diameter of the second segment 111B is less than an inner diameter of the third segment 111C. In this way, the cartridge 30 is correspondingly located at a position of the first segment 111A, the magnet 21 of the electromagnetic unit 20 is correspondingly located at a position of the second segment 111B, and the coil 22 is correspondingly located at a position of the third segment 111C.

In an embodiment, also referring to FIG. 1, the magnet 21 of the electromagnetic unit 20 includes a first magnet 211, and the first magnet 211 is a hollow cylinder but is not limited thereto. The first magnet 211 has a through hole 2111. The through hole 2111 threads through two ends of the first magnet 211, and the first magnet 211 has an outer surface 2112 and an inner surface 2113. An area surrounded by the inner surface 2113 defines the through hole 2111. Herein, the first magnet 211 is accommodated in the second segment 111B, and one end of the first magnet 211 abuts against a step between the second segment 111B and the first segment 111A. In addition, the first magnet 211 in this embodiment is made of a magnetic material.

Continuing to refer to FIG. 1, the coil 22 is wound outside the outer surface 2112 of the first magnet 211. Herein, the coil 22 is accommodated inside the third segment 111C. Herein, the coil 22 is limited by a step between the third segment 111C and the second segment 111B, and is therefore restricted inside the third segment 111C.

Further, two ends of the coil 22 may be connected to a circuit unit C by using two conductive wires. The segments 111 of the accommodating space 11 may further include a fourth segment 111D. The circuit unit C may be fixedly disposed inside the fourth segment 111D of the accommodating space 11. Herein, an inner diameter of the fourth segment 111D is greater than the inner diameter of the third segment 111C, and therefore the circuit unit C is restricted inside the fourth segment 111D.

Referring to FIG. 1, in an embodiment, the cartridge 30 is a long-rod-shaped structure. Herein, the cartridge 30 has a tip end 31 and a combination end 32 that are opposite to each other. The tip end 31 has a tip contact surface 311. The tip end 31 of the cartridge 30 extends from the port 12, and is used for touch or writing by using the tip contact surface 311. The combination end 32 is located inside the accommodating space 11 and is in linkage connection to the pressing member 40.

Continuing to refer to FIG. 1, in an embodiment, the pressing member 40 is a stepped cylinder. Herein, the pressing member 40 has a first section 41 and a second section 42. An outer diameter of the first section 41 is greater than an outer diameter of the second section 42, and a step exists due to a difference between the outer diameters of the first section 41 and the second section 42. Herein, the first section 41 of the pressing member 40 has a first combination portion 411. The combination end 32 of the cartridge 30 is detachably combined with the first combination portion 411 of the pressing member 40.

Further, in an embodiment, the combination end 32 of the cartridge 30 has a head section 321, a neck section 322, and a body section 323 that are sequentially connected. Herein, the head section 321 is a half-spherical structure, the head section 321 is smoothly necked down to the neck section 322, and the neck section 322 gradually expands and becomes the body section 323. The first combination portion 411 of the pressing member 40 is a groove. The shape of an inner peripheral surface of the first combination portion 411 corresponds to the shape of an outer profile of the head section 321, the neck section 322, and the body section 323 of the combination end 32 of the cartridge 30. In this way, the cartridge 30 is detachably assembled to the pressing member 40 due to engagement of the combination end 32 with the first combination portion 411, so that when the cartridge 30 wears or deforms, a user replaces the cartridge 30 with a required cartridge 30 by himself/herself, thereby replacing the cartridge 30 and maintaining best writing feeling.

Also referring to FIG. 1, the first elastic member 50 is disposed inside the accommodating space 11, one end of the first elastic member 50 is fixed on the pressing member 40, and the other end faces toward the pressure sensing element 70. In this way, when the cartridge 30 is pressed due to a writing action, the cartridge 30 drives the pressing member 40 to press the pressure sensing element 70, so that the pressure sensing element 70 senses writing pressure. Herein, the second section 42 of the pressing member 40 has a second combination portion 421. The second combination portion 421 is a groove, and the first elastic member 50 is fixedly embedded in the second combination portion 421.

Further, continuing to refer to FIG. 1, in an embodiment, the first elastic member 50 has a first end 51 and a second end 52 that are opposite to each other. The first end 51 abuts against the pressing member 40, and the second end 52 faces toward the pressure sensing element 70. An outer diameter of the first end 51 is different from an outer diameter of the second end 52. More specifically, the outer diameter of the first end 51 is greater than the outer diameter of the second end 52. A change between the outer diameter of the first end 51 and the outer diameter of the second end 52 may be a linear change, a curvature change, or a slope change, but is not limited thereto. Specifically, for the change from the first end 51 to the second end 52, a smaller change within a unit distance is better. In other words, a smoother change from the first end 51 to the second end 52 is better, so that a change of a pressure gradient better satisfies an expected value of the user.

In this embodiment, both the first end 51 and the second end 52 are cylinder structures, and the first end 51 is connected to the second end 52 by using an inclined section 53. Specifically, the first elastic member 50 may be made of a rubber material having an elastic restoring force, but is not limited thereto.

Referring to FIG. 1, in an embodiment, the second elastic member 60 is accommodated inside the accommodating space 11, one end of the second elastic member 60 abuts against the pressing member 40, and the other end is fixed. The second elastic member 60 may be a common coil spring, a conical spring, a disc spring, or another elastic material having a compression capability. Moreover, the second elastic member 60 may directly or indirectly abut against the electromagnetic unit 20, to provide an elastic force in the axial direction X for the electromagnetic unit 20. Herein, the second elastic member 60 is a coil spring that is sleeved on the second section 42 of the pressing member 40 and abuts against the first section 41. In this way, the second elastic member 60 is also sleeved on an outer periphery of the first elastic member 50, so that the first elastic member 50 is located at a central position on the second elastic member 60, but is not limited thereto.

Continuing to refer to FIG. 1, the pressure sensing element 70 is fixedly disposed inside the accommodating space 11 and is electrically connected to the circuit unit C. Herein, the pressure sensing element 70 is located at a position facing toward the second end 52 of the first elastic member 50. Further, a micro gap approaching to zero exists between the pressure sensing element 70 and the second end 52 of the first elastic member 50.

Specifically, the micro gap between the pressure sensing element 70 and the first elastic member 50 is a gap between the pressure sensing element 70 and the first elastic member 50 when no force is applied to the cartridge 30. Therefore, due to the micro gap approaching to zero, when no force is applied to the cartridge 30, no force is generated between the cartridge 30 and the pressure sensing element 70, thereby preventing the pressure sensing element 70 from being pressed in a normal state.

Figure 2:
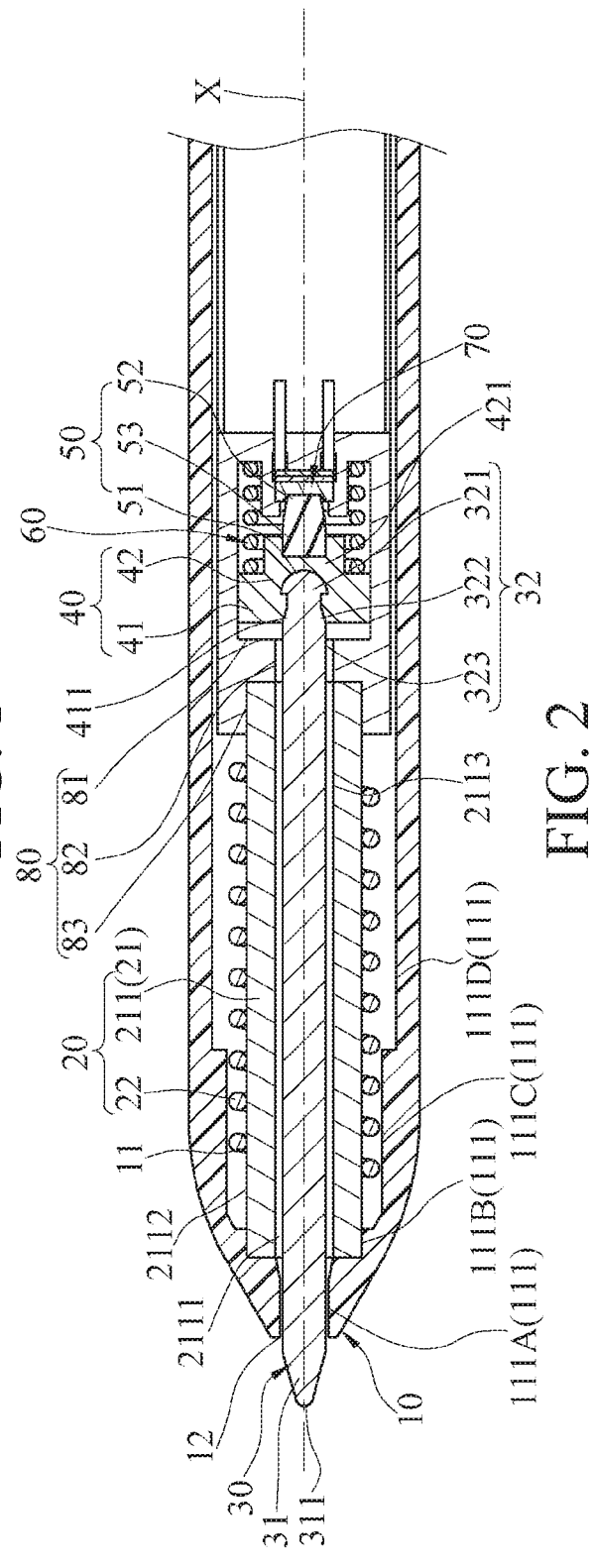
FIG. 2 is a diagram of a use state of the embodiment of FIG. 1.

Referring to FIG. 2, when the pressure sensing pointer is used and applies pressure to the cartridge 30, the cartridge 30 drives the pressing member 40 to be displaced along the axial direction X and toward the pressure sensing element 70. In this case, the cartridge 30 simultaneously drives the first elastic member 50 to be displaced and compresses the second elastic member 60, the first elastic member 50 is driven and is gradually displaced toward the pressure sensing element 70, and the second elastic member 60 continuously accumulates an elastic force. When displacement amount of the first elastic member 50 exceeds a distance of the micro gap, the first elastic member 50 starts to push the pressure sensing element 70 and starts to provide the user with hand feeling of the pressure gradient. Meanwhile, pressure between the first elastic member 50 and the pressure sensing element 70 makes the first elastic member 50 deform and start accumulating an elastic force.

Next, when pressure continues to be applied to the cartridge 30 to make the first elastic member 50 continuously be in contact with the pressure sensing element 70, the pressure sensing element 70 can sense stroke pressure and display handwriting with different stroke pressure through calculation. After the user releases the pressure applied to the cartridge 30, the first elastic member 50 and the second elastic member 60 release the accumulated elastic forces, so that the pressing member 40 is pushed back to the initial position.

Figure 3:
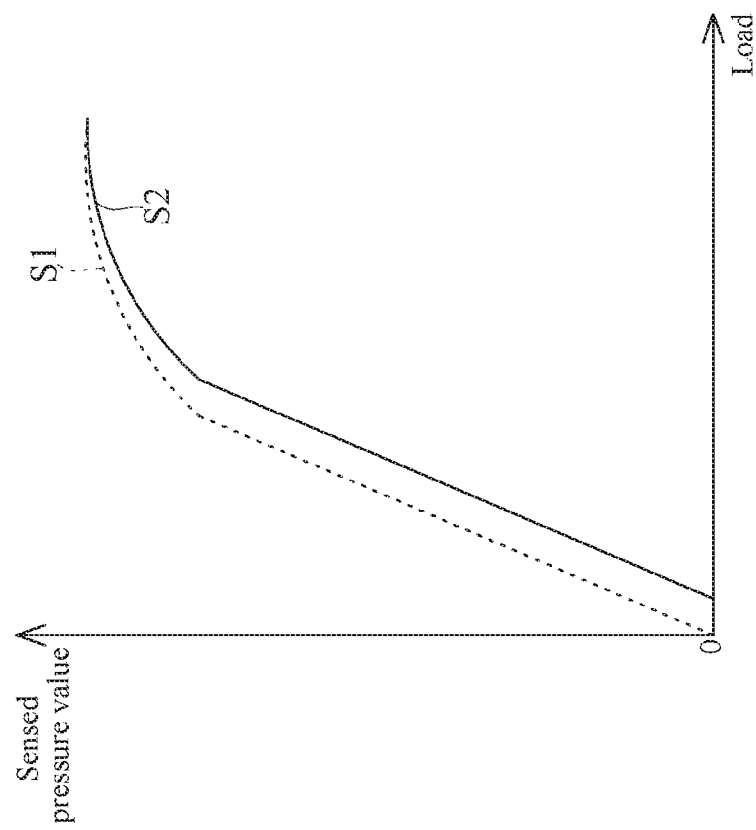
FIG. 3 is a change curve chart of load (x-axis) born by a cartridge of a pressure sensing pointer according to the present invention and a pressure sensing value (y-axis) sensed by a pressure sensing element.

Further, referring to FIG. 3, FIG. 3 is a change curve chart of load (x-axis) born by a cartridge and a pressure sensing value (y-axis) sensed by a pressure sensing element. A first sensing curve S1 and a second sensing curve S2 are available in FIG. 3. The first sensing curve S1 is a sensing curve when no micro gap exists between the pressure sensing element 70 and a component pressing the pressure sensing element 70 or prepressure exists between the pressure sensing element 70 and the component pressing the pressure sensing element 70. The second sensing curve S2 is a sensing curve when the micro gap exists between the pressure sensing element 70 and the first elastic member 50. It can be more clearly learned from FIG. 3 that when no micro gap exists between the pressure sensing element 70 and the component pressing the pressure sensing element 70 or prepressure exists between the pressure sensing element 70 and the component pressing the pressure sensing element 70, as long as pressure is applied to the cartridge 30, the pressure sensing element 70 can sense a pressure value. When the micro gap exists between the pressure sensing element 70 and the first elastic member 50, pressure applied to the cartridge 30 cannot immediately cause the pressure sensing element 70 to sense a pressure value. Instead, the pressure sensing element 70 can measure a pressure value only when the pressure sensing element 70 is pressed by the first elastic member 50 after the first elastic member 50 is displaced by a distance of the micro gap when a force is applied to the cartridge 30.

It can be learned that because a common pressure sensing element 70 has a pressure sensing range of a specific degree, when no force is applied to the cartridge 30 and the cartridge 30 does not apply prepressure to the pressure sensing element 70, it can be ensured that the pressure sensing element 70 can provide a complete pressure sensing range during use, so that the pressure sensing element 70 maintains maximum compressible energy before pressure is applied to the pressure sensing element 70, thereby increasing a permissible sensing range of the pressure sensing element 70 during use of the pressure sensing pointer.

In addition, the micro gap between the pressure sensing element 70 and the first elastic member 50 may alternatively means that the first elastic member 50 does not apply prepressure to the pressure sensing element 70 after assembly of the pressure sensing pointer is completed and when the user does not use the cartridge 30 for writing or touch. In this way, during assembly of the pressure sensing pointer, precision of applying prepressure does not need to be controlled, assembly difficulty can be significantly reduced, and assembly efficiency is increased.

In an embodiment, the pressure sensing element 70 may be an MEMS (micro-electro-mechanical system), but the pressure sensing element is not limited thereto. The pressure sensing element 70 may be a piezoelectric pressure sensing element performing sensing by using a piezoelectric effect, a capacitive pressure micro-sensor, an electromagnetic sensing element, or a resistive sensing element.

In this embodiment, the amount of compression deformation of the second elastic member 60 in the axial direction X is greater than the amount of compression deformation of the first elastic member 50. Therefore, when elastic fatigue of the first elastic member 50 occurs as a result of material fatigue, material deterioration, or deformation, the second elastic member 60 can still provide power to the pressing member 40 for elastic recovery, thereby ensuring that the cartridge 30 can be used for writing each time under a same condition, and increasing use precision. In addition, after the pressure sensing pointer is assembled and before the pressure sensing pointer is used, the first elastic member 50 does not apply prepressure to the pressure sensing element 70. That is, the first elastic member 50 is not in a pressed state when being in the normal state. In this way, a time at which elastic fatigue of the first elastic member 50 occurs can be delayed, thereby extending a service life of the first elastic member 50.

In an embodiment, continuing to refer to FIG. 1, to further improve structural stability of internal mechanical parts, a fixed member 80 is further included. The fixed member 80 is fixedly disposed inside the accommodating space 11 of the housing 10. Herein, the fixed member 80 has a concave hole 81, a shaft hole 82, and a limiting slot 83. The concave hole 81 is in communication with the limiting slot 83 by using the shaft hole 82. More specifically, the concave hole 81 may allow the pressing member 40 to be accommodated in the concave hole 81 and displaced along the axial direction X. An inner peripheral profile of the shaft hole 82 is the same as an outer peripheral profile of the cartridge 30, and the shape and size of the limiting slot 83 corresponds to the shape and size of an outer peripheral profile of an end face of the first magnet 211.

Based on this, the pressure sensing element 70 is fixed on one end of the concave hole 81 in the axial direction X. One end of the second elastic member 60 abuts against the end that is in the concave hole 81 and on which the pressure sensing element 70 is fixed, and the other end abuts against the pressing member 40. Herein, the second elastic member 60 is a compression spring. Therefore, the second elastic member 60 stretches and abuts against the pressing member 40 in the normal state, so that in the normal state, the pressing member 40 abuts against the other end of the concave hole 81 in the axial direction X. The first elastic member 50 is located between the two ends of the concave hole 81. The other end of the first magnet 211 abuts against the limiting slot 83. The cartridge 30 is combined with the pressing member 40 after passing through the through hole 2111 of the first magnet 211 and the shaft hole 82. In this way, each mechanical part inside the housing 10 is stably positioned to obtain a stable structural configuration.

Referring to FIG. 4, FIG. 4 shows another embodiment of the present invention. A structural configuration in the embodiment of FIG. 4 is approximately the same as that of the embodiment of FIG. 1 and FIG. 2, and details are not described. Only differences are described below.

Referring to FIG. 4, in this embodiment, a head section 321 of a combination end 32 of a cartridge 30 is trapezoid and has two symmetrical bevels 3211. The bevels 3211 gradually expands from the head section 321 to a neck section 322, and the neck section 322 is necked down to a body section 323. Based on a shape of the bevels 3211, an assembly direction can be guided during assembly of the cartridge 30, thereby improving assembly convenience. In addition, different types of a first elastic member 50 are shown in this embodiment. Herein, a first end 51 and a second end 52 of the first elastic member 50 are cylinder structures. An outer diameter of the first end 51 is greater than an outer diameter of the second end 52, and the first end 51 is perpendicularly connected to the second end 52, to form a T-shaped cylinder structure. In this embodiment, the first end 51 of the first elastic member 50 is in contact with a second section 42 of the pressing member 40. The first end 51 of the first elastic member 50 may be bonded to the second section 42 of the pressing member 40 by using adhesive, a bolt or another fixing method. This is not limited thereto.

Referring to FIG. 5, FIG. 5 shows another embodiment of the present invention. A structural configuration in the embodiment of FIG. 5 is approximately the same as those of the embodiments of FIG. 1 to FIG. 4, and details are not described. Only differences are described below.

Herein, a magnet 21 of an electromagnetic unit 20 further includes a second magnet 212, and the electromagnetic unit 20 further includes a protection member 23. The protection member 23 wraps the second magnet 212. Herein, the protection member 23 has a head portion 231 and a shaft portion 232. The second magnet 212 is completely wrapped with the head portion 231, and the shaft portion 232 extends along a central axis of the second magnet 212 and forms a long-strip structure. In addition, the head portion 231 of the protection member 23 has a first engaging end 2311, and the shaft portion 232 has a second engaging end 2321. The second engaging end 2321 forms the shape corresponding to the shape of a first combination portion 411 of a pressing member 40. In this way, the shaft portion 232 of the protection member 23 passes through a through hole 2111 of a first magnet 211, and is combined with the pressing member 40 by using the second engaging end 2321.

Continuing to refer to FIG. 5, in this embodiment, a cartridge 30 is of an over cap shape, and a combination end 32 of the cartridge 30 is of a groove shape. A combination end 32 forms the shape corresponding to the shape of the first engaging end 2311 of the protection member 23. Based on this, the cartridge 30 is detachably sleeved on the head portion 231 of the protection member 23 by engaging the combination end 32 with the first engaging end 2311. In this way, the cartridge 30 is combined with the protection member 23, the second magnet 212 is wrapped with the protection member 23, and the protection member 23 is combined with the pressing member 40.

In this embodiment, the protection member 23 is made of a material having a buffer capability. For example, the protection member 23 may be made of ABS (acrylonitrile butadiene styrene) resin or a mixed material of ABS resin and PC (polycarbonate, PC) plastic. This is not limited thereto. The protection member 23 having a buffering capability wraps the second magnet 212, to protect the second magnet 212. In this way, the protection member 23 provides the buffering capability when a pressure sensing pointer suffers from an impact force, to protect the second magnet 212 from being damaged, and ensure that the second magnet 212 is not displaced and does not affect sensing.

When this embodiment is used, the cartridge 30 drives the protection member 23 to be displaced. The shaft portion 232 of the protection member 23 drives the pressing member 40 and the first elastic member 50 that is combined with the pressing member 40 to press the pressure sensing element 70. The pressure sensing element 70 senses a force born by the cartridge 30, thereby further performing calculation to simulate simulation stroke.

Referring to FIG. 5, in this embodiment, the head portion 231 of the protection member 23 abuts against a step between a first segment 111A and a second segment 111B. In this way, the protection member 23 is restricted inside the accommodating space 11 and cannot be easily removed from a port 12.

In an embodiment, referring to FIG. 5, the second magnet 212 has a first end 2121 and a second end 2122 that are opposite to each other. An outer diameter of the first end 2121 is greater than an outer diameter of the second end 2122, and the first end 2121 of the second magnet 212 is closer to the first magnet 211 relative to the second end 2122. That is, the second end 2122 of the second magnet 212 is closer to the port 12 relative to the first end 2121. Herein, the cartridge 30 is sleeved on a position on the protection member 23 corresponding to the second end 2122 of the second magnet 212. In this way, because the size of the second end 2122 close to port 12 is less than that of the first end 2121, the size of the cartridge 30 correspondingly wrapping the second end 2122 of the second magnet 212 is reduced. Based on this, the cartridge 30 of the pressure sensing pointer in this embodiment is closer to a digitizer tablet during use, thereby increasing precision and stability of coordinates and a pressure gradient of the cartridge 30.

Referring to FIG. 6, FIG. 6 shows another embodiment of the present invention. A structural configuration in the embodiment of FIG. 6 is approximately the same as those of the foregoing embodiments, and details are not described. Only differences are described below.

In this embodiment, an electromagnetic unit 20 includes a first magnet 211 and a coil 22, and the first magnet 211 is a solid rod structure. The coil 22 is also wound outside an outer periphery of the first magnet 211.

Herein, the pressure sensing pointer further includes a cartridge connection member 90. The cartridge connection member 90 is accommodated inside an accommodating space 11 of the housing 10. The cartridge connection member 90 is a hollow enclosure structure. The first magnet 211 and the coil 22 are fixedly accommodated inside the cartridge connection member 90. One end of the cartridge connection member 90 is connected to a pressing member 40, and the other end is connected to the cartridge 30. In addition, the pressing member 40 is also combined with the first elastic member 50, and a second elastic member 60 coils around the pressing member 40, but is not limited thereto.

Specifically, an outer peripheral profile of the cartridge connection member 90 forms the shape corresponding to shapes of a second segment 111B and a third segment 111C, and the cartridge connection member 90 can be displaced inside the accommodating space 11 along the axial direction X. Moreover, a first section 41 of the pressing member 40 has a sleeve edge 412. The cartridge connection member 90 is sleeved on the sleeve edge 412, and the first magnet 211 is through-disposed and fixedly disposed inside the sleeve edge 412.

Further, in this embodiment, a fixed member 80 is fixed at a fourth segment 111D inside the accommodating space 11, and is of a boss shape, so that the pressure sensing element 70 is fixed, and the second elastic member 60 is sleeved on and abuts against the fixed member 80.

Herein, the cartridge connection member 90 has a combination portion 91. The combination portion 91 is a groove formed corresponding to the shape of a combination end 32 of the cartridge 30. The cartridge 30 in this embodiment can be replaced due to that the combination end 32 is detachably connected to the combination portion 91 of the cartridge connection member 90.

In this embodiment, when pressure is applied to the cartridge 30 for writing, the cartridge 30 drives the cartridge connection member 90 to be displaced, the cartridge connection member 90 drives the pressing member 40 to press the first elastic member 50, the second elastic member 60, and the pressure sensing element 70, and the pressure sensing element 70 senses writing pressure and accurately presents the writing pressure.

Referring to FIG. 7, FIG. 7 shows another embodiment of the present invention. A structural configuration in the embodiment of FIG. 7 is approximately the same as that of the embodiment of FIG. 6, and details are not described. Only differences are described below.

A difference between this embodiment and the embodiment of FIG. 6 is the shape of a first elastic member 50. In this embodiment, the first elastic member 50 also has a first end 51 and a second end 52, and an outer diameter of the first end 51 is greater than an outer diameter of the second end 52. Herein, the first elastic member 50 further has a connection section 54. The connection section 54 is connected to the first end 51, and an outer diameter of the connection section 54 is less than the outer diameter of the first end 51. The connection section 54 of the first elastic member 50 is engaged inside a second combination portion 421 of a pressing member 40. Based on this, in this embodiment, a purpose or an effect the same as that of the foregoing embodiments is also achieved by using the first elastic member 50 having the different form.

Figure 8:
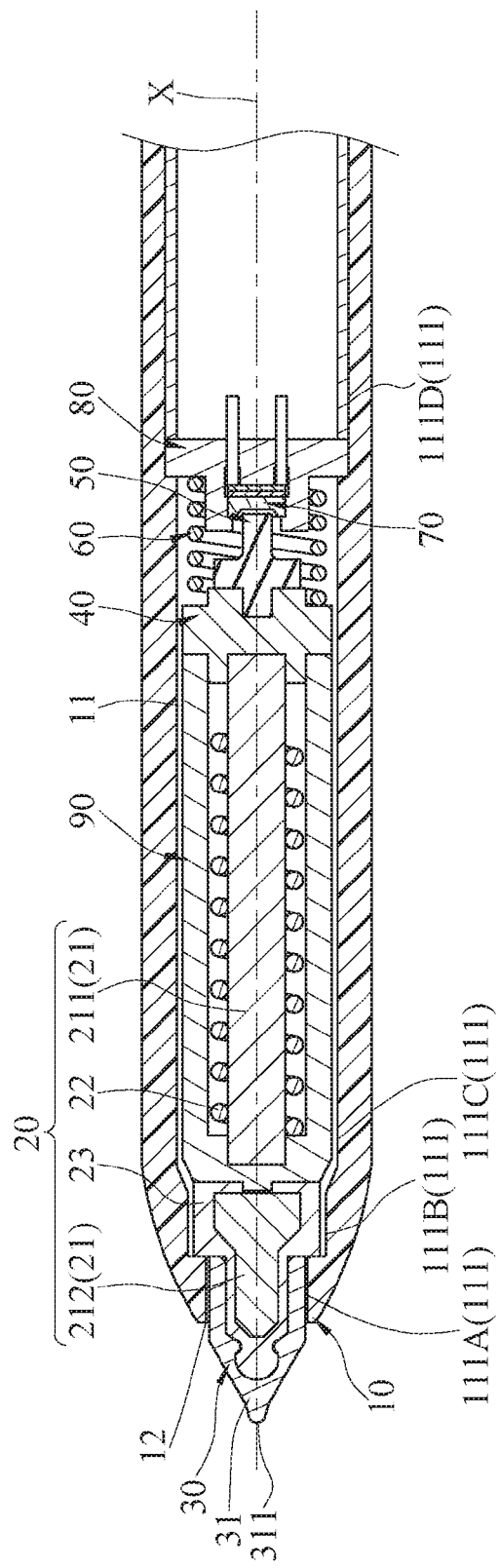
FIG. 8 is a schematic sectional structural diagram of a further embodiment of a pressure sensing pointer according to the present invention.

Referring to FIG. 8, FIG. 8 shows another embodiment of the present invention. A structural configuration in the embodiment of FIG. 8 is approximately the same as that of the embodiment of FIG. 7, and details are not described. Only differences are described below.

Differences between this embodiment and the embodiment of FIG. 7 are a structural configuration of an electromagnetic unit 20 and a shape of a cartridge 30. In this embodiment, the electromagnetic unit 20 includes a first magnet 211, a coil 22, a second magnet 212, and a protection member 23. Both the first magnet 211 and the second magnet 212 are solid structures. The first magnet 212 and the coil 22 are accommodated inside a cartridge connection member 90. The protection member 23 is fixed on the cartridge connection member 90 after wrapping the second magnet 212. The cartridge 30 is detachably sleeved on the protection member 23. Based on this, in this embodiment, a purpose or an effect the same as that of the foregoing embodiments is also achieved by using the electromagnetic unit 20 having the different configuration and the cartridge 30 having the different form.

Figure 9:
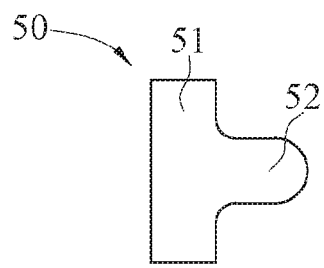
FIG. 9 to FIG. 11 are schematic diagrams of a first elastic member of a pressure sensing pointer according to the present invention.
Figure 10:
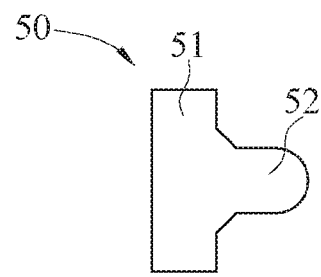
Figure 11:
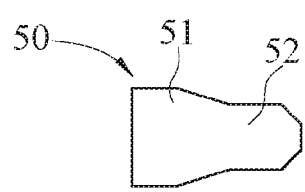

In some embodiments, the shape of the first elastic member 50 may vary provided that the first end 51 is greater than the second end 52, and variations thereof are shown in FIG. 9 to FIG. 11, but are not limited thereto. Provided that the first end 51 of the first elastic member 50 is greater than the second end 52, better writing feeling can be provided.

Figure 12:
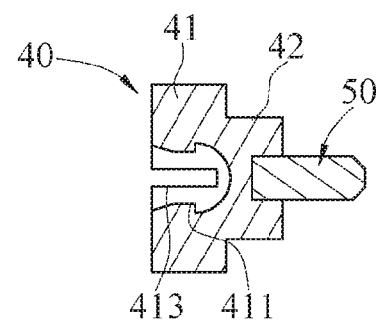
FIG. 12 is a diagram of another implementation of a pressing member of a pressure sensing pointer according to the present invention.

In addition, referring to FIG. 12, FIG. 12 shows another implementation of a pressing member 40. Herein, a first section 41 of the pressing member 40 further has an operation notch 413, and the operation notch 413 threads through a first combination portion 411. With the operation notch 413, a user can more easily replace a cartridge 30 or a protection member 23 engaged inside the first combination portion 411, thereby improving convenience.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A pressure sensing pointer, comprising:
   a housing, having an accommodating space and a port, wherein the port is in communication with the accommodating space;
   an electromagnetic unit, located inside the accommodating space, and comprising a magnet and a coil, wherein the coil is wound outside the magnet;
   a cartridge, wherein the cartridge is movably disposed at the port of the housing along an axial direction;
   a pressing member, wherein the pressing member is movably disposed in the accommodating space along the axial direction, and is connected to the cartridge;
   a first elastic member, disposed inside the housing, wherein one end is fixed on the pressing member;
   a second elastic member, disposed inside the housing, wherein one end abuts against the pressing member, the other end is fixedly disposed inside the accommodating space, and an amount of compression deformation of the second elastic member in the axial direction is greater than an amount of compression deformation of the first elastic member in the axial direction; and
   a pressure sensing element, fixedly disposed inside the accommodating space, wherein the pressure sensing element faces toward the other end of the first elastic member.

2. The pressure sensing pointer according to claim 1, wherein a micro gap exists between the pressure sensing element and the first elastic member.

3. The pressure sensing pointer according to claim 2, wherein the micro gap approaches to zero.

4. The pressure sensing pointer according to claim 1, wherein the first elastic member is located at a central position on the second elastic member.

5. The pressure sensing pointer according to claim 1, wherein the first elastic member is rubber, and the second elastic member a coil spring.

6. The pressure sensing pointer according to claim 1, wherein the first elastic member has a first end and a second end that are opposite to each other, the first end abuts against the pressing member, the second end faces toward the pressure sensing element, and an outer diameter of the first end of the first elastic member is different from an outer diameter of the second end.

7. The pressure sensing pointer according to claim 6, wherein the outer diameter of the first end of the first elastic member is greater than the outer diameter of the second end.

8. The pressure sensing pointer according to claim 1, wherein the magnet of the electromagnetic unit comprises a first magnet, the first magnet is a hollow cylinder, and the cartridge passes through the first magnet and combines with the pressing member.

9. The pressure sensing pointer according to claim 8, wherein the cartridge has a tip end and a combination end that are opposite to each other, the pressing member has a combination portion, and the combination end of the cartridge detachably combines with the combination portion.

10. The pressure sensing pointer according to claim 9, wherein the combination end has a body section, a neck section, and a head section that are sequentially connected, and an outer diameter of the neck section is less than outer diameters of the body section and the head section.

11. The pressure sensing pointer according to claim 1, wherein the electromagnetic unit further comprises a protection member, the magnet comprises a first magnet and a second magnet, the first magnet is a hollow cylinder and is fixedly disposed inside the accommodating space, the protection member wraps the second magnet, passes through the first magnet and combines with the pressing member, and the cartridge is combined with the protection member.

12. The pressure sensing pointer according to claim 1, further comprising a cartridge connection member, wherein the cartridge connection member is movably disposed in the accommodating space along the axial direction, the magnet is a solid cylinder, the cartridge and the magnet are fixedly combined with the cartridge connection member, and the cartridge connection member is fixedly combined with the pressing member.

* * * * *